May 5, 1925.
D. S. DE LAVAUD
1,536,820
VARIABLE SPEED TRANSMISSION
Filed July 7, 1924
2 Sheets-Sheet 2
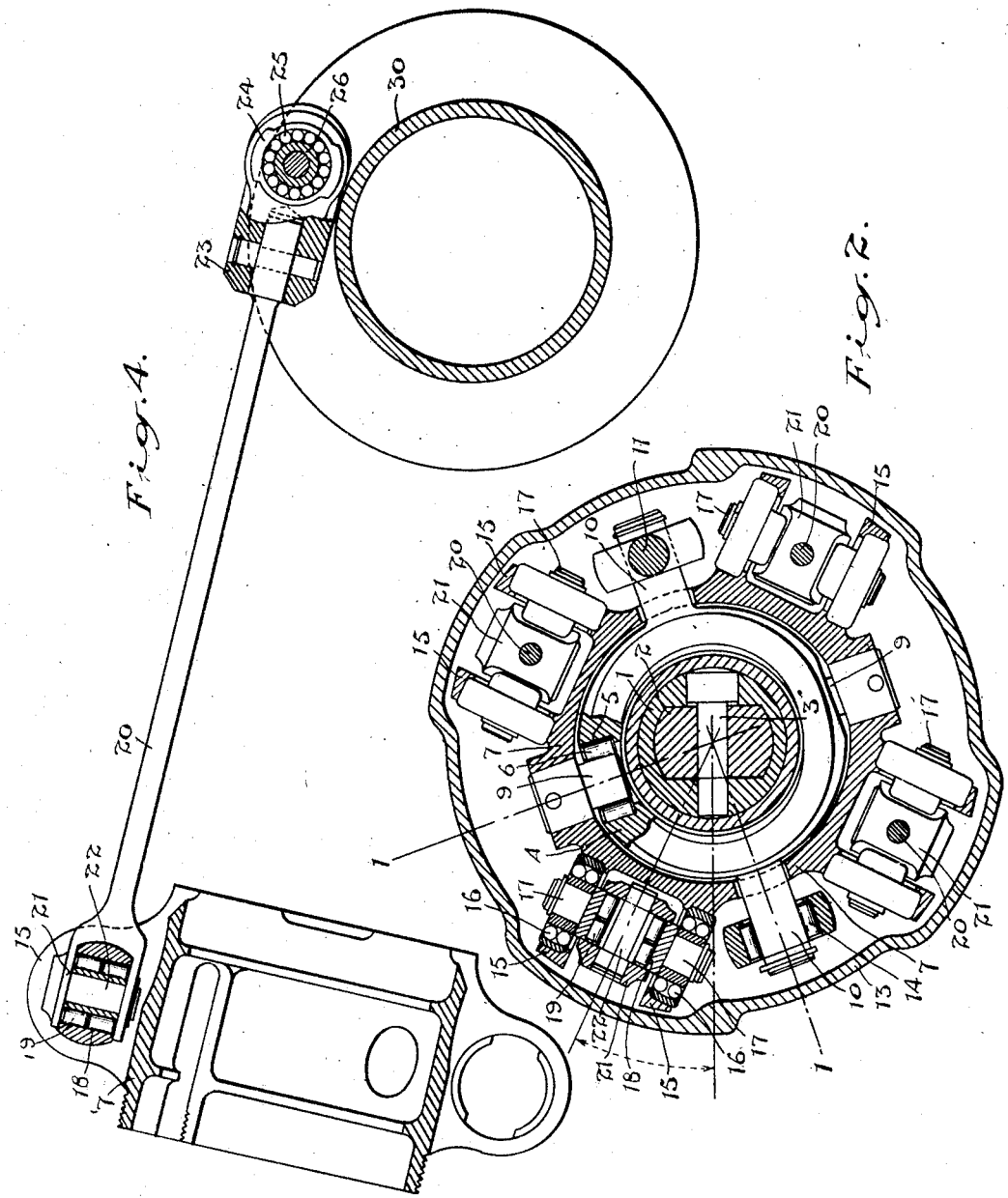
Inventor.
Dimitri Sensaud de Lavaud
by H. J. S. Dennison
atty Patented May 5, 1925.

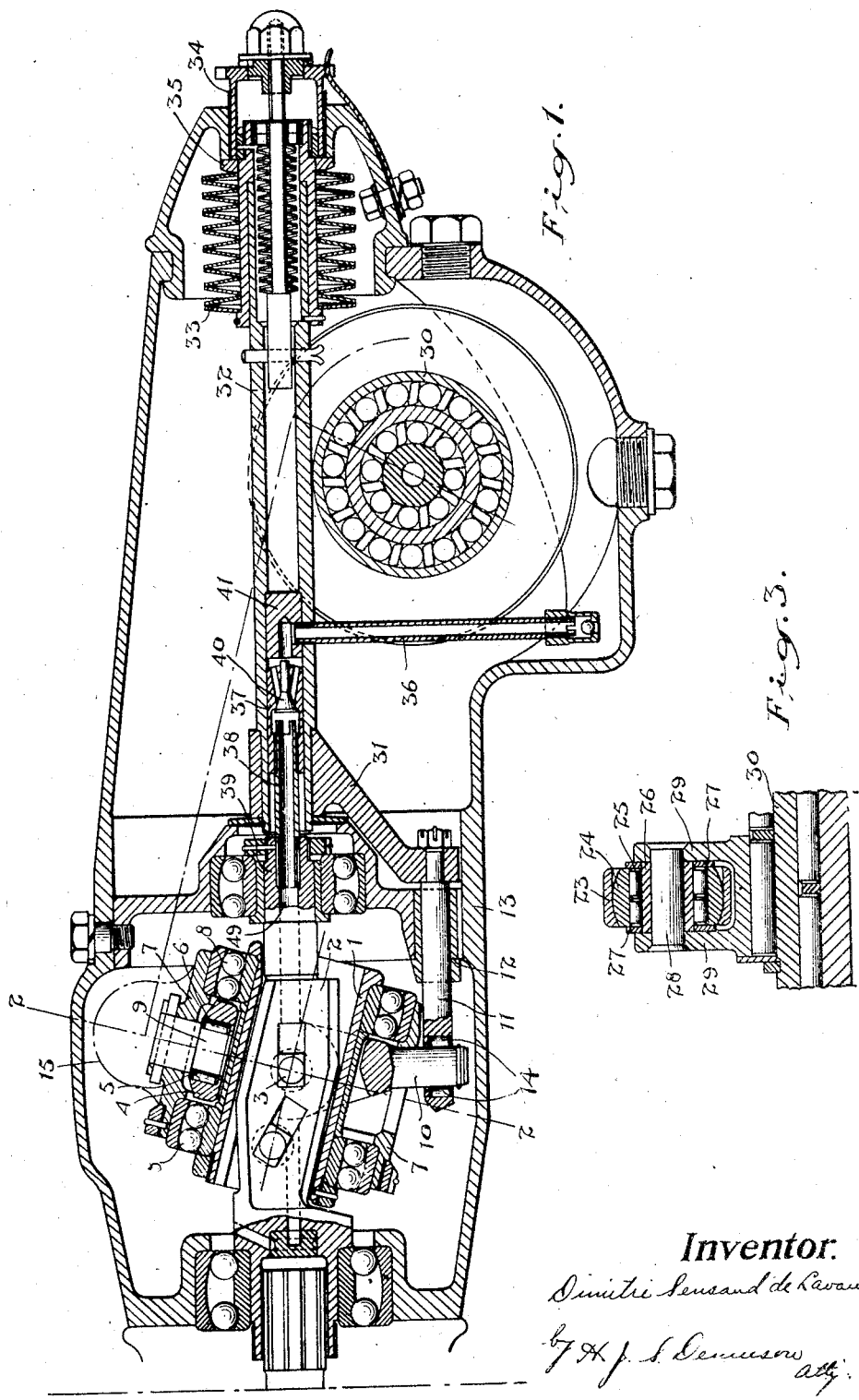

1,536,820

UNITED STATES PATENT OFFICE.

DIMITRI SENSAUD DE LAVAUD, OF PARIS, FRANCE.

VARIABLE-SPEED TRANSMISSION.

Application filed July 7, 1924. Serial No. 724,607.

*To all whom it may concern:*

Be it known that I, DIMITRI SENSAUD DE LAVAUD, a citizen of the United States of Brazil, and resident of the city of Paris, in the Republic of France, have invented certain new and useful Improvements in Variable-Speed Transmission, as described in the following specification and illustrated in the accompanying drawings, that form part of the same.

The principal objects of the invention are to improve the construction of the type of transmission mechanism which utilizes an oscillatable member rotatably connected with the drive shaft to operate a plurality of reciprocable members to impart motion to the driven shaft and particularly to obtain a more flexible connection between the driving oscillating member and the driven member and to ensure strength and durability of the high speed power transmitting parts.

A still further object is to simplify the construction in the mechanism for maintaining the balance of the oscillatable driving member.

The principal feature of the invention consists in the novel construction of the journal connections of the reciprocable members to the oscillating driving member, whereby a sturdy and sensitive universal connection is established, and whereby the Cardan ring support of the floating oscillating member is coupled inside the said member.

A further important feature consists in the novel manner of connecting the oscillating member with the elastic balancing medium.

In the drawings, Figure 1 is a longitudinal mid-sectional view partly on the line 1—1 of Figure 2.

Figure 2 is an elevational and part sectional view on the line 2—2 of Figure 1.

Figure 3 is a transverse sectional view of the journal connection for the reciprocating members with the driven members.

Figure 4 is an elevational and part sectional view of one of the reciprocating members showing the driving and driven members.

The transmission of power at variable speeds through the operation of an oscillatable member rotatable with the driving shaft and carrying a non-rotative member to operate a plurality of reciprocable members which actuate to impart a rotary motion to a transverse shaft has been disclosed in my co-pending applications, and elastic resistance couples have also been previously disclosed.

In the construction herein shown the sleeve 1 encircling the crank extension 2 and pivoted on the pin 3, is encircled by the Cardan ring 4 which is provided with radially disposed orifices 5 in which are arranged the roller bearings 6.

A sleeve 7 encircles the ring 4 and is mounted on the ball bearings 8 carried by the sleeve 1 and the sleeve 1 rotates freely within the sleeve 7.

The Cardan ring 4 is pivotally connected to the sleeve 7 by a pair of pins 9 arranged diametrically opposite and extending into the radially disposed roller bearing orifices 5.

The ring 4 is anchored from rotation by the projecting pins 10 which extend through openings in the sleeve 7 and engaged by the horizontally slidable rods 11 arranged in the bushings 12 in the frame structure of the enclosing casing 13.

The engaging contact between the pins 10 and the rods 11 is preferably through roller bearings 14 arranged in the rods 11.

The sleeve 7 is formed with a plurality of pairs of lugs 15 arranged in diametrically opposite relation and spaced between the axes of the pins 9 and 10.

The lugs 15 support the ball bearings 16 and in these bearings are mounted the cross pins 17, each of which is provided with a transverse orifice 18 in which is located a roller bearing 19.

The reciprocating power transmitting rods 20 are each formed with jaw ends 21 which embrace the cross pins 17 and pins 22 extending transversely of the jaws 21 bear upon the roller bearings 19. This ball and roller bearing connection forms a very free and easily operable universal joint.

At the opposite ends of the rods 20 the heads 23 secured thereto are each formed with a part spherical bore in which is located a socket member 24 which forms the race way for the roller bearings 25 of the bushing 26.

Washers 27 are arranged at each end of the bushing 26 and enclose the roller bearings. The bushing 26 is mounted upon a pin 28 secured between the double flanges 29 of the shaft driving ratchet ring 30 which operates the driven shaft.

This form of connection is such that the rod 20 may operate freely with the slight rotational twist imparted thereto by the oscillating displacement of the sleeve.

It will be readily understood from this description that every movement of the oscillating driving member and its connections will be carried out with the least possible interference as every point of contact is journalled with antifriction bearings and is free.

To the rear ends of the rods 11 are secured the arms 31 which are connected together and are secured to a tube 32 which is arranged in axial alignment with the propeller shaft to which the crank shaft 2 is connected. This tube carries at its rear end the elastic couple formed by the Belleville discs 33 which are adjusted by means of a threaded adjusting member 34 arranged in the outer casing and a collar 35 arranged at the inner end of the adjusting member.

A secondary resisting couple is arranged within the tube 32 in opposition to the couple 33 to eliminate vibration through the re-action of the main couple.

The lubrication of the rotating parts may be affected in numerous ways but I have herein shown an oil tube 36 secured to the tube 32 and extending downwardly into the oil containing casing.

A piston 37 is arranged within the tube 32 and is connected by a tube 38 to the end 39 of the drive shaft. The piston 37 is provided with a valve 40 which co-operates with the bushing 41 arranged at the end of the oil tube 36 so that the longitudinal movement of the tube 32 imparts a suction to draw oil upwardly from the gear case and the return movement forces the oil past the valve 40.

The shaft 49 is formed with a suitable duct to conduct the oil to the various operating members and bearings within the casing.

The reciprocation of the tube 32 is effected through the rods 11 connected with the Cardan ring 4 which is connected through the pins 9 to the sleeve 7 which is connected through the bearings of the sleeve 7 with the sleeve 1 to which the oscillating pivot is connected.

What I claim as my inveniton is:—

1. In a variable speed transmission, a drive shaft having a crank extension and a sleeve pivotally and slidably mounted upon said extension in such manner that it is caused to pivot when slid, a non-rotatable sleeve mounted on the aforesaid sleeve, anti-friction bearings supporting the latter sleeve, a Cardan ring connected to the outer sleeve and holding it from rotation, longitudinally moveable means connected with said Cardan ring, and resilient means for opposing the movement of said Cardan ring.

2. In a variable speed transmission, a drive shaft having a crank extension and a sleeve pivotally and slidably mounted upon said extension in such manner that it is caused to pivot when slid, a non-rotatable sleeve mounted on the aforesaid sleeve, anti-friction bearings supporting the latter sleeve, a Cardan ring arranged between said inner and outer sleeves, pins extending from the outer sleeve into and engaging the Cardan ring, reciprocable means for holding said Cardan ring from rotation, resilient means for resisting the movement of said reciprocable means, and motion transmitting rods connected with the aforesaid outer ring member.

3. In a variable speed transmission, a drive shaft having a crank extension and a sleeve pivotally and slidably mounted upon said extension in such manner that it is caused to pivot when slid, a non-rotatable sleeve mounted on the aforesaid sleeve, anti-friction bearings supporting the latter sleeve, a Cardan ring arranged between said inner and outer sleeves, pins extending from the outer sleeve into and engaging the Cardan ring, reciprocable means for holding said Cardan ring from rotation, a casing enclosing the crank shaft and connections thereto, rods longitudinally slidable in said casing, pins extending from said Cardan ring through the outer ring and engaging said slidable rods, a yoke member connecting said slidable rods, a sleeve connected to said yoke member and arranged in axial alignment with the shaft, an elastic couple connected with the said sleeve to balance the vibrations of the device, a driven shaft arranged transversely of the casing, and a plurality of driving rods connected to the outer oscillating sleeve.

4. In a variable speed transmission a drive shaft having a crank extension and a sleeve pivotally and slidably mounted upon said extension in such manner that it is caused to pivot when slid, a non-rotatable sleeve mounted on the aforesaid sleeve, anti-friction bearings supporting the latter sleeve, a Cardan ring connected to the outer sleeve and holding it from rotation, a plurality of paired lugs extending outwardly from the outer ring, each of said pairs of lugs having ball bearings therein, a transversely arranged pin journalled in said ball bearings, said pin having a transverse orifice therethrough, power transmitting rods each extending between a pair of said lugs and having a jaw embracing said transversely journalled pin, a pivot pin secured in each of said jaws and extending through the transverse orifice in said journal pin, and means for translating the movement of said rods.

5. In a variable speed transmission, a drive shaft having a crank extension, an oscillating member mounted on said crank, a plurality of rods connected to said oscillating member, ratchet members connected to the driven shaft, transversely arranged pins secured in said ratchet members, spherically formed socket members encircling said pins and forming part with said rods, spherically surfaced rings arranged in said socket members, and journal bearings supporting said rings on said pins.

6. In a variable speed transmission, the combination with a crank driving shaft, a sleeve oscillatably supported on said crank shaft, a sleeve rotatably mounted on the aforesaid sleeve, a Cardan ring arranged between said sleeves having radial orifices, pins extending inwardly from the outer ring into said radial orifices, roller bearings in said orifices engaging said pins, means for translating the oscillatory movement of the outer ring to the driven shaft, a slidable member having a plurality of arms having orifices therein, pins extending from the Cardan ring into said orifices, roller bearings in said orifices surrounding said Cardan ring pins, spring means for stabilizing the movement of the Cardan ring, a piston fixed in relation to the longitudinal movement, a tube enclosing said piston, a tube leading from the aforesaid tube to an oil supply, and a valve arranged in said piston adapted to control the flow of oil.

DIMITRI SENSAUD de LAVAUD.